(12) United States Patent
Shen et al.

(10) Patent No.: US 8,737,616 B2
(45) Date of Patent: May 27, 2014

(54) METHOD AND APPARATUS FOR IDENTIFYING CGA PUBLIC KEY, AND METHOD, APPARATUS, AND SYSTEM FOR DETERMINING CGA PUBLIC KEY

(75) Inventors: Shuo Shen, Shenzhen (CN); Sheng Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 13/105,475

(22) Filed: May 11, 2011

(65) Prior Publication Data

US 2011/0219231 A1    Sep. 8, 2011

Related U.S. Application Data (63) Continuation of application No. PCT/CN2009/071335, filed on Apr. 17, 2009.

(30) Foreign Application Priority Data

Nov. 13, 2008    (CN) .......................... 2008 1 0217421

(51) Int. Cl.
*H04L 29/06*    (2006.01)
(52) U.S. Cl.
USPC ............ 380/255; 380/277; 713/150; 713/171
(58) Field of Classification Search
None
See application file for complete search history.

(56) References Cited

U.S. PATENT DOCUMENTS

| | | | |
|---|---|---|---|
| 2001/0012361 A1* | 8/2001 | Kasahara | 380/30 |
| 2005/0221797 A1* | 10/2005 | Howard | 455/411 |
| 2006/0253704 A1 | 11/2006 | Kempf et al. | |
| 2007/0113075 A1* | 5/2007 | Jo et al. | 713/158 |

(Continued)

FOREIGN PATENT DOCUMENTS

| | | |
|---|---|---|
| CN | 1564509 A | 1/2005 |
| CN | 1710985 A | 12/2005 |

(Continued)

OTHER PUBLICATIONS

J. Kempf, CGA Extensions BOF, Aug. 2007.*

(Continued)

*Primary Examiner* — Yin-Chen Shaw
*Assistant Examiner* — Brian Olion
(74) *Attorney, Agent, or Firm* — Brinks Gilson & Lione (57) ABSTRACT

A method and an apparatus for identifying a Cryptographically Generated Address (CGA) public key, and a method, an apparatus, and a system for determining a CGA public key are disclosed. The method for identifying a CGA public key includes: receiving, by a receiving node, a first message protected using a public key from a sending node; obtaining a type of the public key according to the first message. The method for determining a CGA public key includes: receiving, by a receiving node, a first message protected using a public key from a sending node; obtaining, a type of the public key to be determined according to the first message; and judging whether the public key to be determined is supported by the receiving node according to the type of the public key to be determined; and, if the public key to be determined is supported by the receiving node, determining the public key as a public key supported by the receiving node. The embodiments of the present invention implement identification and determining of public keys in the process of CGA that supports multiple public keys.

19 Claims, 8 Drawing Sheets

(56) References Cited

U.S. PATENT DOCUMENTS

2008/0104403 A1* 5/2008 Gueron ................. 713/176
2008/0304457 A1 12/2008 Thubert et al.
2011/0093716 A1 4/2011 Liu et al.

FOREIGN PATENT DOCUMENTS

| CN | 1835633 A | 9/2006 |
|---|---|---|
| CN | 101110671 A | 1/2008 |
| CN | 101162999 A | 4/2008 |
| CN | 101175074 A | 5/2008 |
| CN | 101299668 A | 11/2008 |
| WO | WO 2007/025484 A1 | 3/2007 |

OTHER PUBLICATIONS

Rossi et al, Secure Route Optimization for MIPv6 Using Ehanced CGA and DNSSEC, Sep. 2013, IEEE, pp. 351-362.*
Qadir et al, A study of CGA—(Cryptographically Generated Address) Signature based authentication of Binding Update messages in low-end MIPv6 node, Jul. 2012, International Conference on Computer and Communication Engineering, pp. 510-514.*
International Search Report issued in corresponding PCT Patent Application No. PCT/CN2009/071335, mailed Aug. 20, 2009.
Nikander et al., "IPv6 Neighbor Discovery (ND) Trust Models and Threats", Network Working Group, rfc3756, May 2004.
Arkko et al., "SEcure Neighbor Discovery (SEND)", Network Working Group, rfc3971, Mar. 2005.
Cheneau et al., "Signature Algorithm Agility in the Secure Neighbor Discovery (SEND) Protocol", CGA & SEND Maintenance, Feb. 21, 2009.
Cheneau et al., "Signature Algorithm Agility in the Secure Neighbor Discovery (SEND) Protocol", CGA & SEND Maintenance, Jun. 5, 2009.
Office Action issued in corresponding Chinese Patent Application No. 200810217421.4, mailed Aug. 31, 2012.
Written Opinion of the International Searching Authority issued in corresponding PCT Patent Application No. PCT/CN2009/071335, mailed Aug. 20, 2009.
Extended European Search Report issued in corresponding European Patent Application No. 09825717.3, mailed Aug. 21, 2012.
Office Action issued in corresponding Chinese Patent Application No. 200810217421.4, mailed Apr. 17, 2013.
Arkko et al., "Secure Neighbor Discovery (SEND)" Network Working Group, Mar. 2005.
Aura, "Cryptographically Generated Addresses (CGA)" Network Working Group, Mar. 2005.
Cheneau et al., "Support for Multiple Signature Algorithms in Cryptographically Generated Addresses (CGAs)" CGA & Send Maintenance, Feb. 21, 2009.
Shen et al., "ECC Support for SEND/CGA" CSI Working Group, Oct. 11, 2008.

* cited by examiner

METHOD AND APPARATUS FOR IDENTIFYING CGA PUBLIC KEY, AND METHOD, APPARATUS, AND SYSTEM FOR DETERMINING CGA PUBLIC KEY

CROSS-REFERENCE TO RELATED APPLICATIONS

This application is a continuation of International Application No. PCT/CN2009/071335, filed on Apr. 17, 2009, which claims priority to Chinese Patent Application No. 200810217421.4, filed on Nov. 13, 2008, both of which are hereby incorporated by reference in their entireties.

FIELD OF THE INVENTION

The present invention relates to communications technologies, and in particular, to a method and an apparatus for identifying a Cryptographically Generated Address (CGA) public key, and a method, an apparatus, and a system for determining a CGA public key.

BACKGROUND OF THE INVENTION

CGA is a special type of Internet Protocol version 6 (IPv6) address. An interface identifier in a CGA is generated by computing a cryptographic one-way hash algorithm from a public key and auxiliary information. When using a CGA, a receiver needs to re-compute a hash value, and compare the hash value with an interface identifier of a sender's CGA to verify the binding relation between a public key of the sender and the CGA. A network message can be protected by attaching the public key and auxiliary information into the message and signing the message with a corresponding private key. To increase the strength against attacks of a CGA, a 3-bit security parameter (SEC) is defined in the existing CGA data structure. The SEC represents the security grade of the CGA and the strength of the CGA is graded according to different SEC values. Furthermore, the SEC value is defined for selecting the Hash algorithm in the CGA algorithm. The CGA solution solves a problem that how to verify an address within the IP layer, and works without a certification authority or any other security infrastructure.

Because the CGA binds the public key of the CGA owner with the private key of the CGA owner, the CGA owner can use the private key to sign a message to be sent so as to make the source of the message to be verified and integrity of the message to be protected. A receiver of the message verifies the CGA and the signature of the message. The source and content of the message are proved to be reliable only if the verification of the CGA and the signature succeeds; if either of the verification fails, the whole verification procedure fails, and the source and content of the message are unreliable.

Ron-Shamir-Adleman (RSA) public key is a public key system invented by Ron-Shamir-Adleman, and can be used for signing in network communication for the purpose of verification. The strength against attacks of a key is required to be more and more intense in the network communication security, therefore the techniques of verifying and signing in CGA, which supports only RSA public key in the prior art, can hardly meet the current requirement. The techniques of verifying and signing in CGA are now on a trend of supporting development and application of multiple public keys. It is now urgent to work out a solution to identifying a public key and determining a public key in the process of verifying and signing in CGA that supports multiple public keys.

SUMMARY OF THE INVENTION

The embodiments of the present invention provide a method, a system, and an apparatus for determining CGA public keys in the process of CGA signature authentication that supports multiple public keys.

According to the first aspect of the present invention a method for determining a CGA public key includes:

receiving, by a receiving node, a first message protected using a public key to be determined from a sending node;

obtaining, by the receiving node, a type of the public key to be determined according to the first message; and judging, by the receiving node, whether the public key to be determined is supported by the receiving node according to the type of the public key to be determined, and, if the public key to be determined is supported by the receiving node, determining, by the receiving node, that the public key is a public key supported by the receiving node.

According to the second aspect of the present invention a system for determining a CGA public key includes:

a first network node, configured to send a first message protected using a public key to be determined; and a second network node, configured to receive the first message sent by the first network node; obtain a type of the public key to be determined according to the first message; judge whether the public key to be determined is supported by the second network node according to the type of the public key to be determined; and, if the public key to be determined is supported by the second network node, determine that the public key is a public key supported by the second network node.

According to the third aspect of the present invention a network node for determining a CGA public key, which works together with another network node to determine the CGA public key, includes:

a public key selecting module, configured to select at least one candidate public key among N candidate public keys deployed on the network node beforehand as a public key to be determined, where N is a positive integer;

a first message processing module, configured to use the public key selected by the public key selecting module to protect the first message;

a first message sending module, configured to send the first message to the another network node;

a first public key obtaining module, configured to obtain a type of the public key to be determined according to a second message sent by the another network node; and a public key negotiating and determining module, configured to use the public key obtained by the first public key obtaining module as a public key determined through negotiation with the other network node.

According to the fourth aspect of the present invention a network node for determining a CGA public key, which works together with another network node to determine the CGA public key, includes:

a second message receiving module, configured to receive a first message protected using a public key to be determined from the another network node;

a second public key obtaining module, configured to obtain a type of the public key to be determined according to the first message; and a public key judging module, configured to judge whether the public key to be determined is supported by the network node according to the type of the public key to be determined, and, if the public key to be determined is supported by the network node, determine that the public key is a public key supported by the network node.

Compared with the prior art, the embodiments of the present invention bring at least the following benefits:

The method, the system, and the apparatus for determining a CGA public key herein determine the public key in the process of verifying and signing in CGA that supports multiple public keys, and pave the way for developing the techniques of verifying and signing in CGA that support multiple public keys.

Moreover, a method and an apparatus for identifying a CGA public key are provided in embodiments of the present invention to identify the CGA public key in the process of verifying and signing in CGA that supports multiple public keys.

According to the fifth aspect of the present invention a method for identifying a CGA public key includes:

receiving a first message protected with a public key from a sending node; and obtaining a type of the public key according to the first message.

According to the sixth aspect of the present invention a network node for identifying a CGA public key includes:

a message receiving module, configured to receive a first message protected with a public key from a sending node; and a public key type obtaining module, configured to obtain a type of the public key according to the first message.

Compared with the prior art, the embodiments of the present invention bring at least the following benefits:

The method and the apparatus for identifying the CGA public key herein identify the public key in the process of verifying and signing in CGA that supports multiple public keys, and pave the way for developing the techniques of verifying and signing in CGA that support multiple public keys.

BRIEF DESCRIPTION OF THE DRAWINGS

To describe the technical solution under the embodiments of the present invention more clearly, the following briefly describes the accompanying drawings involved in the embodiments of the present invention. Apparently, the accompanying drawings described below are not exhaustive, and persons of ordinary skill in the art can derive other drawings from such accompanying drawings without any creative effort.

DETAILED DESCRIPTION OF THE EMBODIMENTS

The following detailed description is given with reference to the accompanying drawings in order to provide a thorough understanding of the present invention. Evidently, the drawings and the detailed description are merely representative of particular embodiments of the present invention, and the embodiments are illustrative in nature rather than exhaustive. All other embodiments that can be derived by those skilled in the art from the embodiments given herein without any creative effort shall fall within the protection scope of the present invention.

Figure 1:
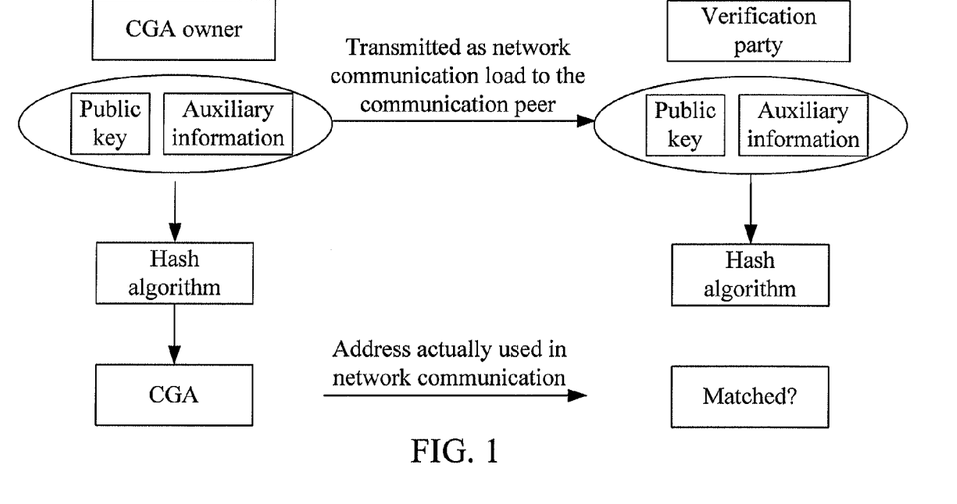
FIG. 1 shows a schematic diagram of CGA authentication.

Request For Comments (RFC) 3972 defines generation, verification and signature of a CGA. As shown in FIG. 1, an interface identifier of a CGA is generated by computing a cryptographic one-way hash algorithm from a public key and auxiliary information, and is transmitted as network communication load to a communication peer. A verification party (such as a receiving node) obtains the public key and the auxiliary information of the CGA owner through interactional communication, verifies the CGA by calculating a hash value again, and comparing the hash value with the CGA actually used in the communication. The foregoing interpretation and FIG. 1 are only simple illustration of the CGA. In practical application, the CGA is more complex, and the hash algorithm is applied twice and security parameters are applied. For more details, see RFC3972.

Embodiment 1

Figure 2:
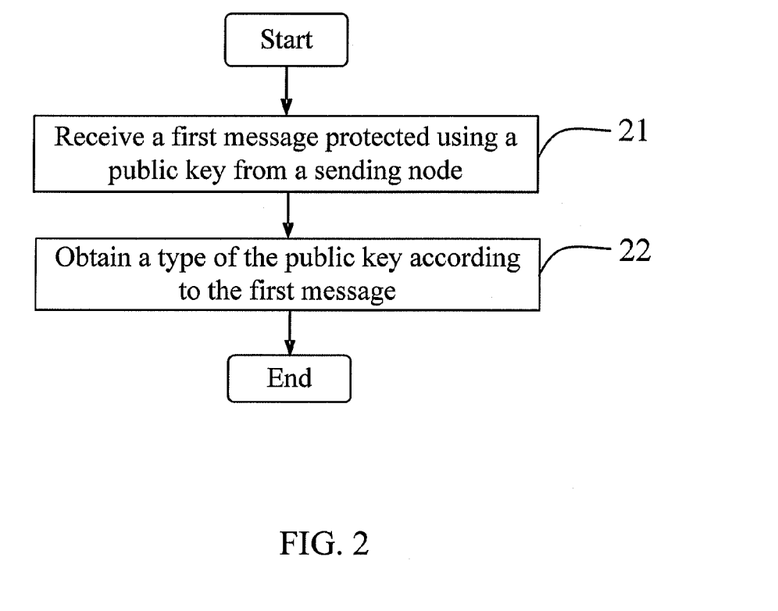
FIG. 2 is a flow chart of a method for identifying a CGA public key according to Embodiment 1 of the present invention.

As shown in FIG. 2, a method for identifying a CGA public key according to this embodiment is applied to a first node and a second node involved in the communication. The first node is generally defined as a sending node, and the second node is generally defined as a receiving node. Generally the sending node is a CGA owner and exchanges messages with the receiving node. Multiple public keys for verifying and signing in CGA may be deployed on the sending node beforehand as required. Types and priorities of the public keys may be set according to the actual requirements and policies, and messages to be sent may be protected in different ways according to actual encryption requirements. For example, three different types of public keys (PK1, PK2 and PK3) are deployed on the sending node beforehand. The sending node may select one of them (for example, PK1) for protecting a message to be sent. A CGA parameter and a CGA signature generated according to PK1 are carried in the message. Alternatively, the sending node may select some or all of the three public keys for protecting the message to be sent. When the sending node selects the three public keys for protecting the message to be sent respectively, the CGA parameters and CGA signatures generated respectively according to the three public keys are carried in the message. The method provided in this embodiment includes:

S21. Receive a first message protected by a public key from a sending node.

A CGA parameter and a CGA signature generated according to the public key may be carried in the first message. Optionally, an indication of a public key supported by the sending node may be carried in the first message. Besides, the public key supported by the sending node may be carried in the first message.

S22. Obtain a type of the public key according to the first message.

Specifically, if the CGA parameter and the CGA signature generated according to the public key are carried in the first message, S22 includes: obtaining the type of the public key according to the CGA parameter and the CGA signature carried in the first message. If the indication of the public key supported by the sending node is carried in the first message, S22 includes: obtaining the type of the public key according to the indication carried in the first message.

The CGA parameter and the CGA signature generated according to one public key may be carried in the first message, or CGA parameters and CGA signatures generated according to multiple public keys respectively may be carried in the first message. If multiple CGA parameters and CGA signatures are carried in the first message, the receiving node may obtain corresponding types of the corresponding public keys according to the CGA parameters and CGA signatures respectively. According to the type of the public key, the receiving node can identify the public key used by the sending node.

Embodiment 2

Figure 3:
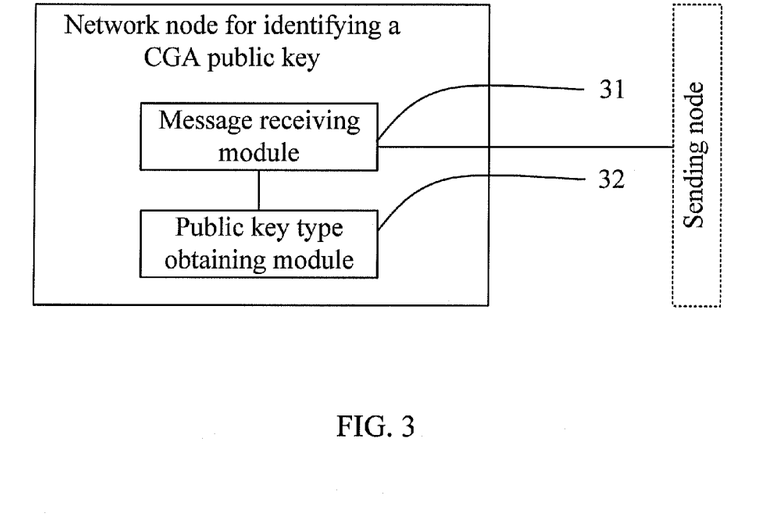
FIG. 3 shows an apparatus for identifying a CGA public key according to Embodiment 2 of the present invention.

As shown in FIG. 3, a network node for identifying a CGA public key according to this embodiment includes:

a message receiving module 31, configured to receive a first message protected by a public key from a sending node; and a public key type obtaining module 32, configured to obtain a type of the public key according to the first message.

Specifically, the public key type obtaining module 32 may include: a first obtaining subunit, configured to obtain the type of the public key according to a CGA parameter and a CGA signature carried in the first message if the CGA parameter and the CGA signature generated according to the public key are carried in the first message; and/or a second obtaining subunit, configured to obtain the type of the public key according to an indication of the public key supported by the sending node carried in the first message if the indication of the public key supported by the sending node is carried in the first message.

If multiple CGA parameters and CGA signatures generated respectively according to multiple public keys are carried in the first message, the public type obtaining module 32 is configured to obtain the types of the corresponding public keys respectively according to the multiple CGA parameters and CGA signatures.

The network node for identifying a CGA public key according to this embodiment corresponds to the receiving node in the method provided in the foregoing embodiment. The application scenario, working mode, and procedure of the network node are similar to those described in the method provided in the embodiment above.

The method and the apparatus for identifying a CGA public key herein identify the public key in the process of verifying and signing in CGA that supports multiple public keys, and pave the way for developing the techniques of verifying and signing in CGA that support multiple public keys.

Embodiment 3

Figure 4:
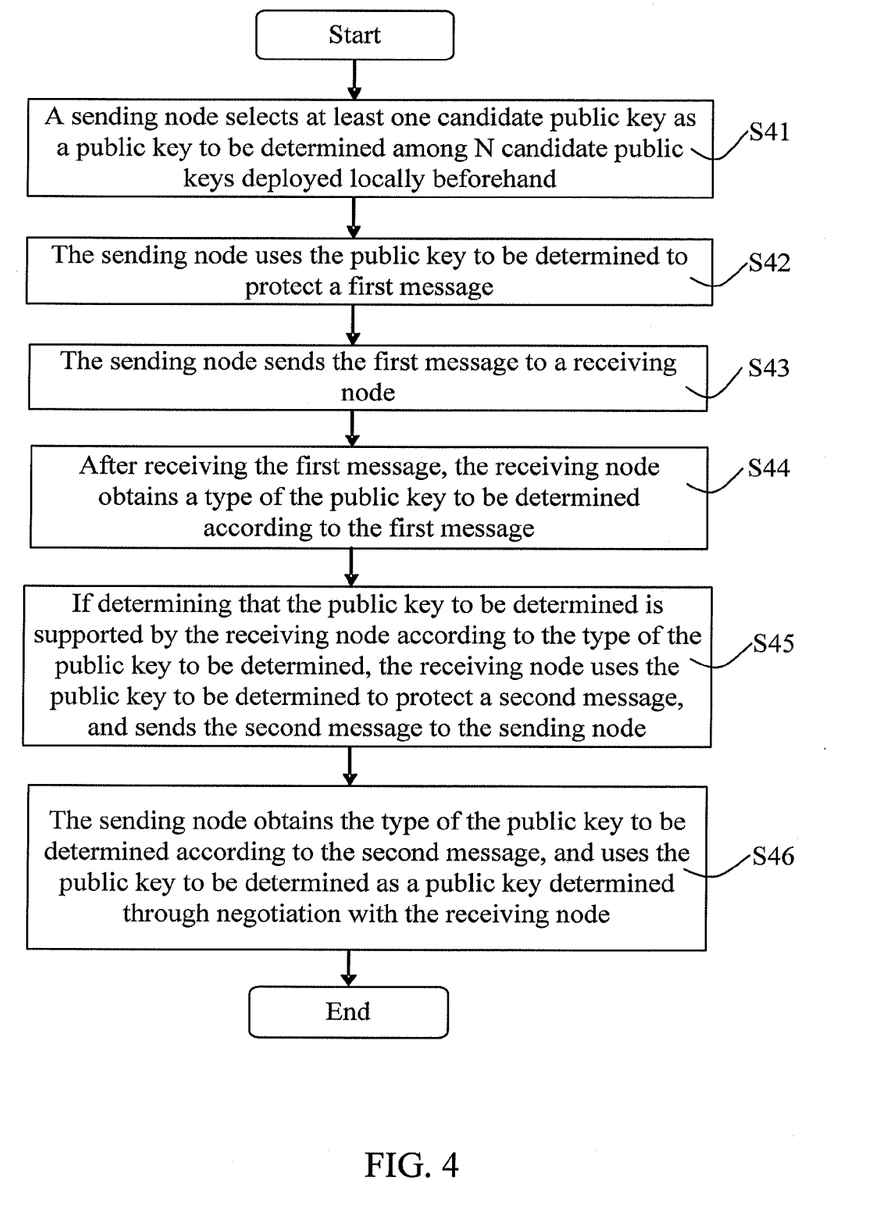
FIG. 4 is a flow chart of a method for determining a CGA public key according to Embodiment 3 of the present invention.

As shown in FIG. 4, a method for determining a CGA public key is provided in this embodiment. The method is applied to a first node and a second node involved in the communication. The first node is generally defined as a sending node, and the second node is generally defined as a receiving node. Multiple candidate public keys for verifying and signing in CGA may be deployed on the sending node and the receiving node beforehand as required. Candidate public keys of different types and priorities deployed on the sending node and the receiving node may be completely the same, partially the same, or completely different, depending on actual requirements and policies. For example, three candidate public keys (PK1, PK2 and PK3) are deployed on the sending node beforehand, two candidate public keys (PK2 and PK3) are deployed on the corresponding receiving node beforehand, and the priorities of the candidate public keys are as follows in descending order: PK1>PK2>PK3.

The method provided in this embodiment may determine the public key through message exchange between the sending node and the receiving node. The method includes:

receiving a first message protected by a public key from a sending node;

obtaining a type of the public key to be determined according to the first message; and judging whether the public key to be determined is supported by the receiving node according to the type of the public key to be determined, and, if the public key to be determined is supported by the receiving node, determining that the public key is a public key supported by the receiving node.

If N candidate public keys are deployed on the sending node beforehand, the method for determining a CGA public key according to this embodiment includes:

S41. The sending node selects at least one candidate public key among N candidate public keys deployed locally beforehand as a public key to be determined, where N is a positive integer.

S42. The sending node uses the public key to be determined to protect the first message.

S43. The sending node sends the first message protected by the public key to be determined to the receiving node.

S44. After receiving the first message, the receiving node obtains the type of the public key to be determined according to the first message.

S45. If determining that the public key to be determined is supported by the receiving node according to the type of the public key to be determined, the receiving node uses the public key to be determined to protect a second message, and sends the second message to the sending node.

S46. The sending node obtains the type of the public key to be determined according to the second message; the sending node uses the public key to be determined as a public key determined through negotiation with the receiving node.

Before S45 is performed, the method in this embodiment may further include: The receiving node judges whether the public key to be determined is supported by the receiving node according to the type of the public key to be determined. If the public key to be determined is not supported by the receiving node, the sending node selects at least another one from the N candidate public keys as another public key to be determined, and returns to S42.

Optionally, if the public key to be determined is not supported by the receiving node, the receiving node returns a third message to the sending node, indicating that the public key to be determined is not supported by the receiving node. Optionally, the receiving node may attach an indication of a public key supported by the receiving node to the third message and sends the third message to the sending node. After receiving the third message, the sending node obtains a type of the public key supported by the receiving node according to the indication carried in the third message, and judges whether the type of the public key supported by the receiving node is a public key type deployed on the sending node beforehand; and, if the type of the public key supported by the receiving node is the public key type deployed on the sending node, the sending node notifies the type of the public key to the receiving node; or, if the type of the public key supported by the receiving node is not the public key type deployed on the sending node, the sending node fails to determine the public key, and the process ends.

Optionally, the sending node may select at least another one from the N candidate public key as the public key to be determined in this way: From the candidate keys that have not been selected as the public key to be determined in the N candidate public keys, the sending node selects at least one candidate public key as the public key to be determined.

Optionally, if the public key to be determined is not supported by the receiving node, the method in this embodiment further includes: The receiving node discards the first message, and does not respond to the sending node. The sending node may select at least another one from the N candidate public key as the public key to be determined in this way: From the candidate keys that have not been selected as the public key to be determined in the N candidate public keys, the sending node selects at least one candidate public key as the public key to be determined if the sending node receives no response from the receiving node within a specified period.

In the foregoing embodiment, the sending node may select one, two, more than two, or all of the candidate public keys deployed locally beforehand according to actual requirements or a policy of selecting the public key, uses the selected public key as the public keys to be determined, and protects the first message using the selected public key. For example, five candidate public keys deployed on the sending node are arranged as PK1->PK2->PK3->PK4->PK5. Assuming that the selection priority order is PK1>PK2>PK3>PK4>PK5, the sending node may select one (such as PK2) of the five candidate public keys according to the deployed selection policy, or select a highest-priority public key (PK1) according to the selection priority order, and use the selected public key as the public key to be determined and protect the first message using this public key. The sending node may also select all the candidate public keys according to the selection priority order, and uses the selected public keys to protect the first message. If one candidate public key (for example, PK1) is selected for protecting the first message, the CGA parameter and the CGA signature generated respectively according to PK1 and a private key corresponding to PK1 are carried in the tail of the first message protected by the public key. If all candidate public keys are used for protecting the first message, CGA parameter 1 and CGA signature 1, CGA parameter 2 and CGA signature 2, CGA parameter 3 and CGA signature 3, CGA parameter 4 and CGA signature 4, and CGA parameter 5 and CGA signature 5, which are generated respectively according to the five candidate public keys and corresponding private keys, are carried in the trail of the first message protected with the public keys.

Secure Neighbor Discovery (SeND) is an IPv6 protocol in which CGA is used to protect Neighbor Discovery Protocol (NDP). The implementation mechanism of the SeND is: A CGA parameter and a CGA signature are carried in a NDP message, and a receiving node of the NDP message verifies the CGA and the signature according to the NDP message, thus the verification of the source of the NDP message and protection of the integrity of the NDP message can be achieved.

As an essential part of the IPv6 protocol, the NDP implements function like Address Resolution Protocol (ARP) in IPv4, the Internet Control Message Protocol (ICMP) router discovery, and the redirection. Furthermore, the NDP provides a mechanism for neighbor unreachable detection.

The NDP implements functions like router and prefix discovery, address resolution, determining of next-hop address, redirection, unreachable neighbor detection, and duplicate address detection; and, optionally, implements functions like link-layer address change, input load balance, Anycast address, and agent advertisement.

The NDP uses five types of ICMPv6 messages to implement various functions of the NDP. The five types of ICMPv6 messages are as follows:

Router Solicitation: When an interface works, a host sends a Router Solicitation message which requests a router to generate a Router Advertisement message immediately rather than rather than at their next scheduled time.

Router Advertisement: A router advertises its presence together with link and network parameters periodically, or in response to the Router Solicitation message. The Router Advertisement message contains prefixes that are used for on-link determination, address configuration, and limited number of hops.

Neighbor Solicitation: A Neighbor Solicitation is sent by a node to request a link-layer address of a neighbor and to verify that a neighbor is still reachable via a cached link-layer address. Neighbor Solicitations are also used for duplicate address detection.

Neighbor Advertisement: It is a response to the Neighbor Solicitation message. The node may also send an Unsolicited Neighbor Advertisement to indicate the link-layer address change.

Redirect: A Redirect message is used by a router to inform a host of a better first hop for a destination if the current route is not the best.

The following describes two embodiments of the present invention with reference to NDP messages.

Embodiment 4

Figure 5:
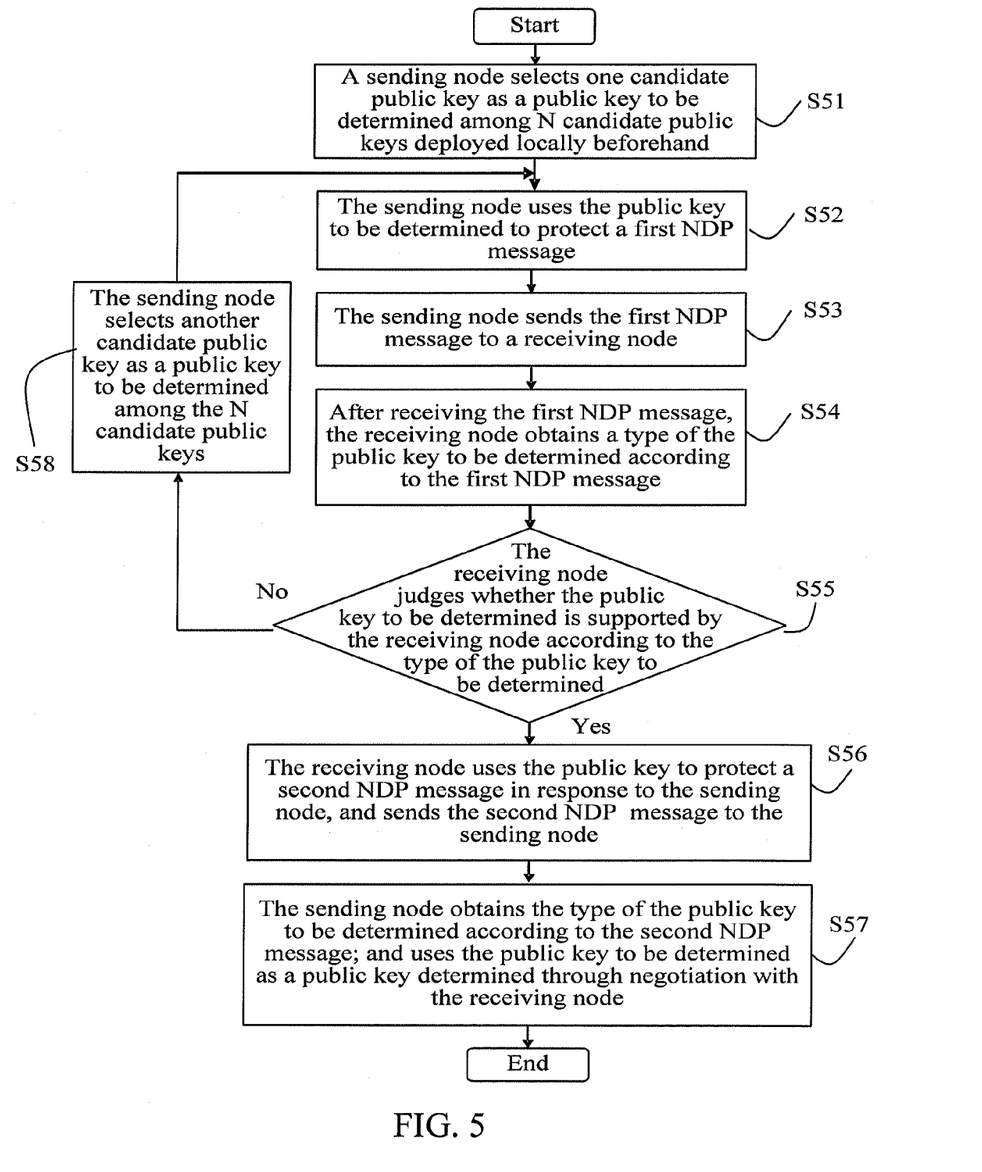
FIG. 5 is a flow chart of a method for determining a CGA public key according to Embodiment 4 of the present invention.
Figure 6:
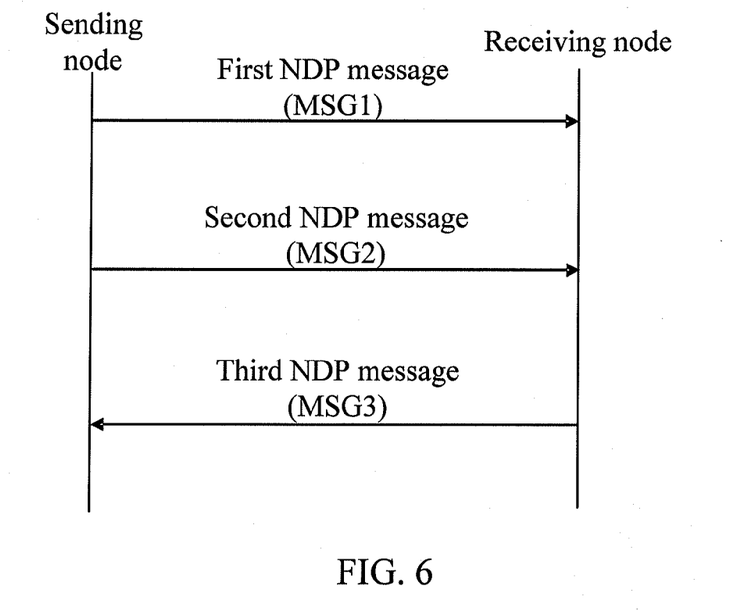
FIG. 6 shows a schematic diagram of message exchange between a sending node and a receiving node according to Embodiment 4 of the present invention.

As shown in FIG. 5 and FIG. 6, a method for determining a CGA public key in this embodiment includes:

S51. A sending node selects one candidate public key among N candidate public keys deployed locally beforehand as a public key to be determined, where N is a positive integer greater than 1.

For example, five candidate public keys deployed on the sending node are arranged as PK1->PK2->PK3->PK4->PK5, and the selection priority order is PK1>PK2>PK3>PK4>PK5. According to the deployed policy of selecting a public key, namely, according to the selection priority order, the sending node selects PK1 as the public key to be determined from high priority to low priority.

S52. The sending node uses the public key to be determined to protect a first NDP message.

Specifically, the sending node uses PK1 to protect the first NDP message MSG1.

S53. The sending node sends the first NDP message protected using the public key to a receiving node.

As shown in FIG. 6, the sending node sends the first NDP message MSG1 protected using the public key to the receiving node. A CGA parameter and a CGA signature generated according to PK1 and a private key corresponding to PK1 are carried in MSG1.

S54. After receiving the first NDP message, the receiving node obtains a type of the public key to be determined according to the first NDP message.

Specifically, after receiving MSG1, the receiving node obtains the type of PK1 according to the CGA parameter and the CGA signature carried in MSG1.

S55. The receiving node judges whether the public key to be determined is supported by the receiving node according to the type of the public key to be determined; and, if the public key to be determined is supported by the receiving node, S56 is performed; or, if the public key to be determined is not supported by the receiving node, S58 is performed.

S56. The receiving node uses the public key to be determined to protect a second NDP message in response to the sending node, and sends the second NDP message protected using the public key to be determined to the sending node.

S57. The sending node obtains the type of the public key to be determined according to the second NDP message, and uses the public key to be determined as a public key determined through negotiation with the receiving node.

S58. The sending node selects another candidate public key among the N candidate public keys as the public key to be determined, and returns to S52.

Generally, in S55 above, by comparing the type of the public key to be determined with the candidate public key deployed locally beforehand, the receiving node judges whether the public key to be determined is supported by the receiving node. If the public key to be determined is not supported by the receiving node, the receiving node discards the first NDP message (MSG1), and does not respond to the sending node. If receiving no response from the receiving node within a specified time, the sending node selects another candidate public key among the N candidate public keys as the public key to be determined, and returns to S52.

In this embodiment, selecting of a candidate public key among the N candidate public keys as a public key to be determined may be performed according to actual requirements or a selection policy deployed locally; for example, the sending node selects a highest-priority candidate public key according to the selection priority order. In S58, selecting, by the sending node, another candidate public key among the N candidate public keys as the public key to be determined specifically includes: Among the candidate public keys that have not been selected as the public key to be determined in the N candidate public keys, the sending node selects a highest-priority candidate public key as the public key to be determined.

For example, two public keys (PK2 and PK3) are deployed on the receiving node; namely, PK2 and PK3 are public keys supported by the receiving node. It is assumed that the selection priority order of the two public keys is the same as that of the candidate public keys deployed on the sending node, namely, the selection priority order is PK2>PK3. After obtaining PK1 according to MSG1, the receiving node compares PK1 with PK2 and PK3 respectively. According to the comparison, if the receiving node determines that PK1 is not supported by the receiving node, the receiving node discards the first NDP message (MSG1), and does not respond to the sending node. If the sending node receives no response from the receiving node within the specified time, the sending node selects a highest-priority candidate public key (namely, PK2) as the public key to be determined among the remaining four candidate public keys that have not been selected as the public key to be determined, and returns to S52. Specifically, the sending node uses PK2 to protect a second NDP message (MSG2), and sends MSG2 to the receiving node. After receiving MSG2, the receiving node obtains the type of PK2 according to MSG2, and compares the type of PK2 with PK2 and PK3. According to the comparison, if the receiving node determines that PK2 is supported by the receiving node, the receiving node constructs an MSG3 in response to the sending node, uses PK2 to protect MSG3, and sends MSG3 to the sending node. After receiving MSG3, the sending node obtains the type of PK2 according to MSG3, and uses PK2 as the public key determined through negotiation with the receiving node. In this way, the CGA public key is determined successfully.

According to the foregoing method, another public key can be determined through message exchange between the sending node and the receiving node. For example, the sending node obtains the type of the public key to be determined (PK2) according to MSG3, and uses PK2 as a public key determined through negotiation with the receiving node according to the type of PK2. Among the five candidate public keys deployed locally, the sending node selects one candidate public key as a public key to be determined; for example, selects PK3 as a public key to be determined among the remaining 3 candidate public keys that have not been selected, and negotiates the public key with the receiving node according to the foregoing method to obtain the public key to be determined in the same way.

Embodiment 5

Figure 7:
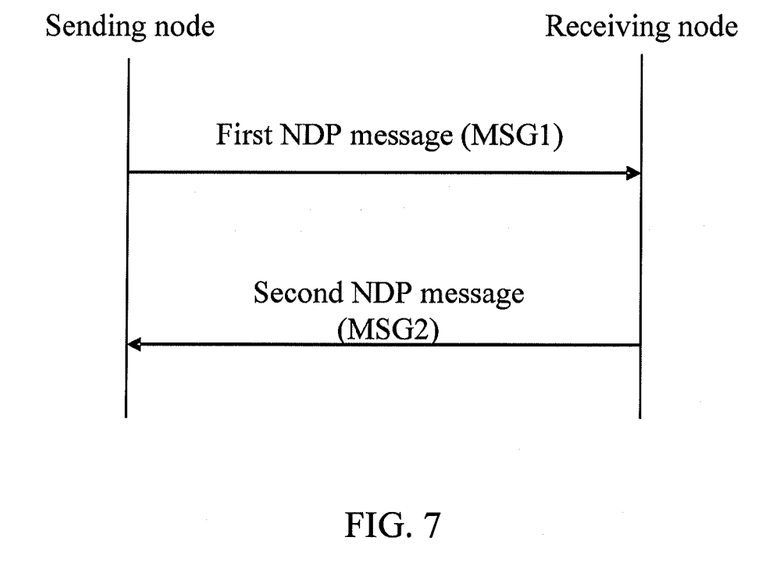
FIG. 7 shows a schematic diagram of message exchange between a sending node and a receiving node according to Embodiment 5 of the present invention.
Figure 8:
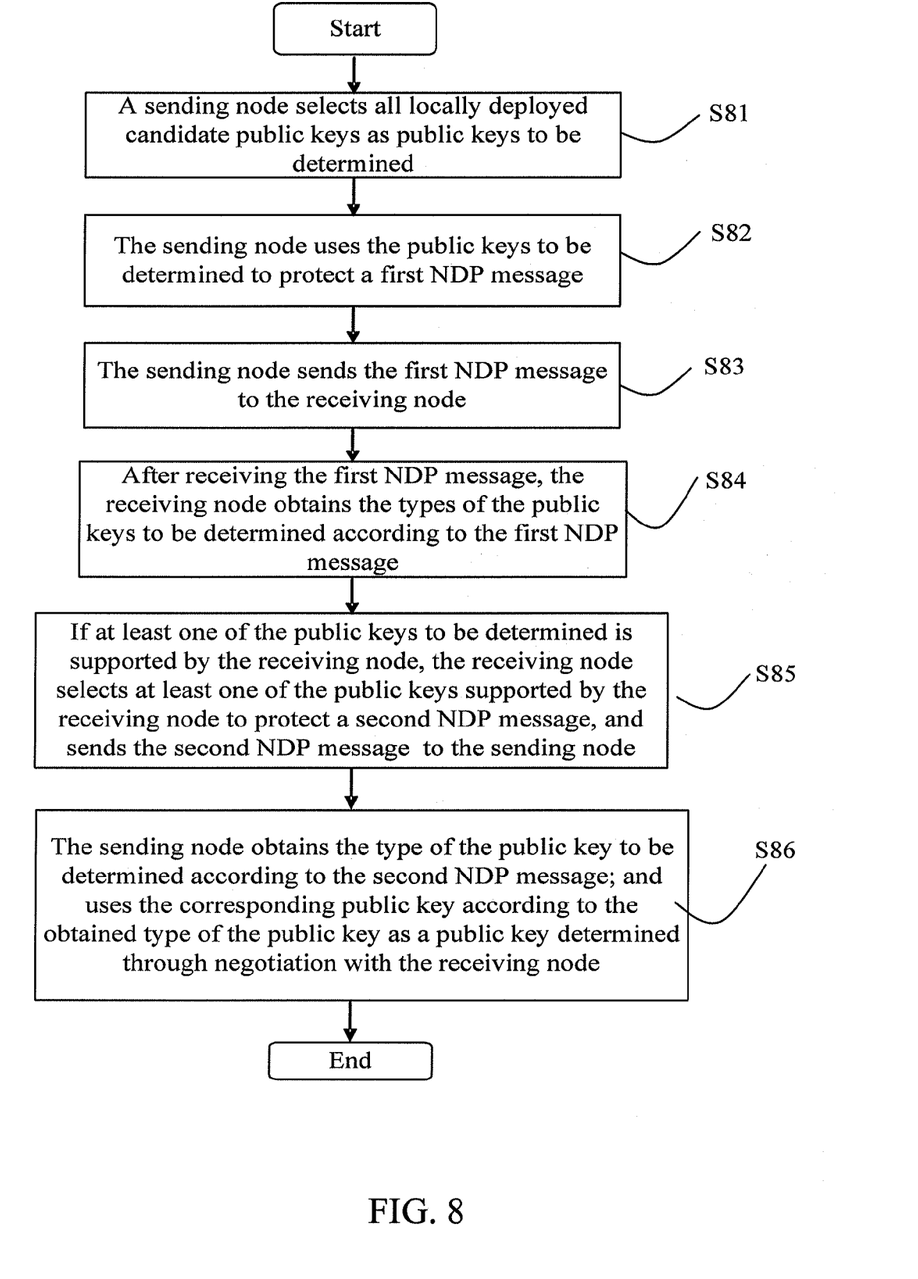
FIG. 8 is a flow chart of a method for determining a CGA public key in according to Embodiment 5 of the present invention.

As shown in FIG. 7 and FIG. 8, another method for determining a CGA public key according to this embodiment includes:

S81. A sending node selects all locally deployed candidate public keys as public keys to be determined.

Assume that four candidate public keys deployed on the sending node are arranged as PK1->PK2->PK3->PK4. The sending node selects all the four candidate public keys as the public keys to be determined, and uses them to protect the first NDP message to be sent to the receiving node.

S82. The sending node uses the public keys to be determined to protect the first NDP message (MSG1).

For example, the arrangement order of the candidate public keys on the sending node is the selection priority order of the candidate public keys, namely, the selection priority order is PK1>PK2>PK3>PK4. In practice, according to the deployed policy of selecting the public key, namely, according to the selection priority order of the four candidate public keys, the sending node selects the candidate public keys for protect the first NDP message (MSG1) from high priority to low priority.

S83. The sending node sends the first NDP message (MSG1) protected using the public keys to the receiving node.

As shown in FIG. 7, the sending node sends the first NDP message (MSG1) protected using the public keys to the receiving node. CGA parameter 1 and CGA signature 1, CGA parameter 2 and CGA signature 2, CGA parameter 3 and CGA signature 3, and CGA parameter 4 and CGA signature 4, which are generated according to the four candidate public keys and corresponding private keys respectively, are carried in the MSG1.

S84. After receiving the first NDP message (MSG1), the receiving node obtains the types of the public keys to be determined according to the first NDP message (MSG1).

Specifically, after receiving MSG1, the receiving node may obtain the types of PK1, PK2, PK3, and PK4 respectively according to the four sets of CGA parameters and CGA signatures carried in MSG1.

S85. If determining that at least one of the public keys to be determined is supported by the receiving node according to the types of the public keys to be determined, the receiving node selects at least one from the public keys supported by the receiving node to protect a second NDP message (MSG2), and sends MSG2 to the sending node.

Optionally, in S84, the receiving node obtains the type of each public key to be determined according to the four sets of CGA parameters and CGA signatures carried in MSG1 respectively. For example, the receiving node obtains the type of PK1 according to CGA parameter 1 and CGA signature 1 carried in MSG1; if determining that PK1 is not supported by the receiving node according to the type of PK1, the receiving node obtains the type of PK2 according to CGA parameter 2 and CGA signature 2 carried in MSG1; if determining that PK2 is not supported by the receiving node according to the type of PK2, the receiving node obtains the type of PK3 according to CGA parameter 3 and CGA signature 3 carried in MSG1. Such a process goes on until a public key to be determined is supported by the receiving node according to the obtained type of the public key to be determined. If PK1 is supported by the receiving node, the procedure proceeds to S85 directly.

If the receiving node obtains the types of PK1, PK2, PK3, and PK4 according to MSG1 in S84, and only PK2 and PK3 are supported by the receiving node, the receiving node selects at least one from PK2 and PK3 to protect MSG2 in S85, and sends MSG2 to the sending node. Optionally, the receiving node selects a public key to be determined for protecting MSG2 according to a preset selection policy; for example, the receiving node selects the highest-priority public key according to the locally configured selection priority order. If the priority of PK2 is higher than that of PK3, the receiving node selects PK2 to protect MSG2. Optionally, in S85, if both PK2 and PK3 are supported by the receiving node, the receiving node may use PK2 and PK3 in order to protect MSG2, and send MSG2 to the sending node. CGA parameter 2 and CGA signature 2, and CGA parameter 3 and CGA signature 3, which are generated according to PK2, PK3, and the corresponding private keys, are carried in MSG2.

S86. The sending node obtains the type of the public key to be determined according to MSG2, where the public key is intended for protecting MSG2; and uses the public key to be determined as a public key determined through negotiation with the receiving node according to the obtained type.

Specifically, the sending node receives MSG2 from the receiving node, and obtains the type of the public key to be determined according to the CGA parameter and the CGA signature carried in MSG2, and uses the public key to be determined as a public key determined through negotiation with the receiving node according to the obtained type. For example, if only CGA parameter 2 and CGA signature 2 are carried in MSG2, the sending node obtains the type of PK2 according to MSG2, and uses PK2 as a public key determined through negotiation with the receiving node according to the type of PK2; if CGA parameter 2 and CGA signature 2, and CGA parameter 3 and CGA signature 3 are carried in MSG2, the sending node obtains the types of PK2 and PK3 according to MSG2, and uses PK2 and PK3 as public keys determined through negotiation with the receiving node according to the types of PK2 and PK3.

According to the designing idea of the present invention, in the method for determining a CGA public key according to the embodiment, the message exchanged between the sending node and the receiving node are not limited to NDP message; how to obtain a type of a public key to be determined is not limited to a CGA parameter and a CGA signature carried in the message. The sending node of a message may add the type of the public key to be determined into the message directly so that the receiving node of the message can obtain the type of the public key from the message. Besides, the sending node of the message may add the selection priority order of the candidate public keys deployed locally to the message, and therefore, the receiving node of the message can determine more quickly whether the public key obtained from the message is supported by the receiving node.

The implementation of the embodiments of the present invention varies according to the actual requirements and application scenarios. For example, if the address in response message is a unicast address, the message may carry only one CGA parameter and one CGA signature generated according to a public key and a private key corresponding to the public key; if the address in response message is a multicast address, for example, if the Router Advertisement is sent periodically or the Neighbor Advertisement is unsolicited, the message may carry only one CGA parameter and one CGA signature generated according to a public key and a private key corresponding to the public key, or carry CGA parameters and CGA signatures generated according to all supported public keys and private keys corresponding to the supported public keys.

In conclusion, in the method for determining a CGA public key according to the embodiment, the sending node involved in the communication specifies one or more public keys for protecting a message according to a policy of selecting candidate public keys deployed locally and the corresponding private keys, and then sends the message to the receiving node; the receiving node judges whether the public key obtained from the message is supported by the receiving node, and sends a message protected using the public key to the sending node, where the message indicates the public key supported by the receiving node. In this way, the public key used between the sending node and the receiving node is determined, the public key can be selected properly in the CGA that supports multiple public keys, which pays the way for developing the techniques of verifying and signing in CGA that support multiple public keys.

Embodiment 6

Figure 9:
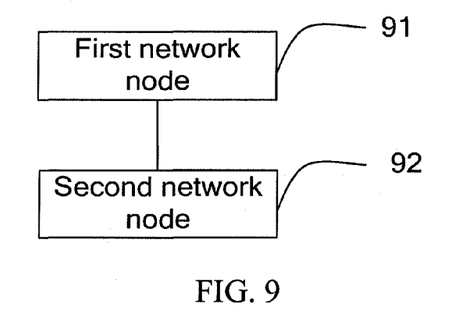
FIG. 9 shows a structure block diagram of a system for determining a CGA public key according to Embodiment 6 of the present invention.

As shown in FIG. 9, a system for determining a CGA public key in this embodiment includes:

a first network node 91, configured to send a first message protected using a public key to be determined; and a second network node 92, configured to receive the first message sent by the first network node 91, obtain a type of the public key to be determined according to the first message, judge whether the public key to be determined is supported by the second network node 92 according to the type of the public key to be determined, and, if the public key to be determined is supported by the second network node 92, determine the public key to be determined as the public key supported by the second network node 92.

The first network node 91 is further configured to select at least one candidate public key among N candidate public keys deployed locally beforehand as the public key to be determined, where N is a positive integer; and use the selected public key to protect the first message.

The second network node 92 is further configured to use the public key to be determined to protect a second message if the public key to be determined is supported by the second network node 92, and send the second message protected using the public key to be determined to the first network node 91; and the first network node 91 is further configured to obtain the type of the public key to be determined according to the second message, and use the public key to be determined as a public key determined through negotiation with the second network node 92 according to the type of the public key to be determined.

Embodiment 7

Figure 10:
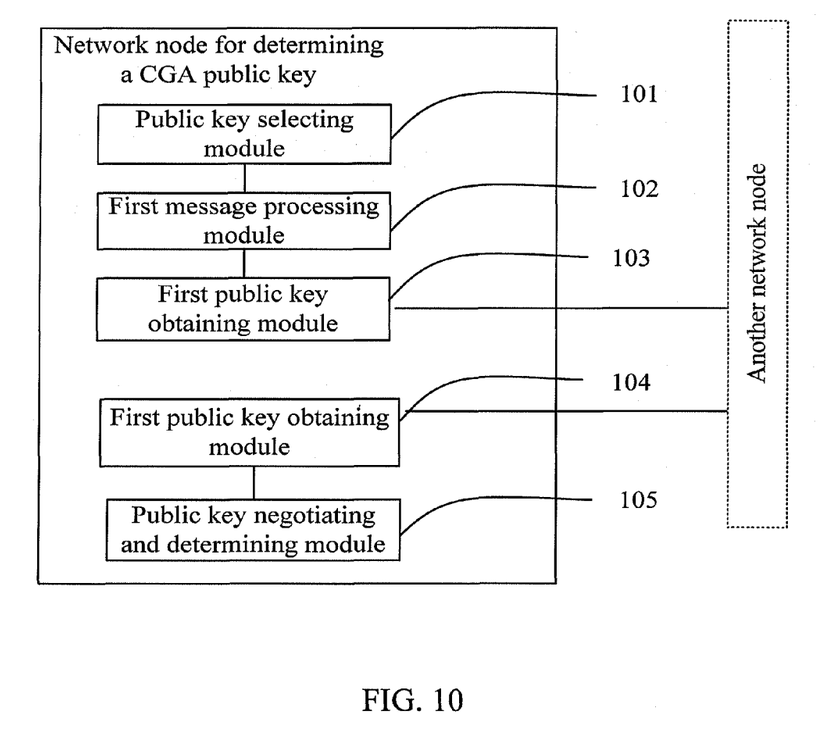
FIG. 10 shows a structure block diagram of a network node for assisting in determining a CGA public key according to Embodiment 7 of the present invention.

As shown in FIG. 10, a network node for determining a CGA public key is provided in this embodiment, and the network node may serve as the first network node described in the system according to the foregoing embodiment. The network node works with another network node to determine a CGA public key, and includes:

a public key selecting module 101, configured to select at least one candidate public key among N candidate public keys deployed beforehand on the network node as a public key to be determined, where N is a positive integer;

a first message processing module 102, configured to use the public key selected by the public key selecting module 101 to protect a first message;

a first message sending module 103, configured to send the first message to the another network node involved in determining the public key;

a first public key obtaining module 104, configured to obtain a type of the public key to be determined according to a second message sent by the another network node; and a public key negotiating and determining module 105, configured to use the public key to be determined according to the type of the public key obtained by the first public key obtaining module 104 as a public key determined through negotiation with the another network node.

Embodiment 8

Figure 11:
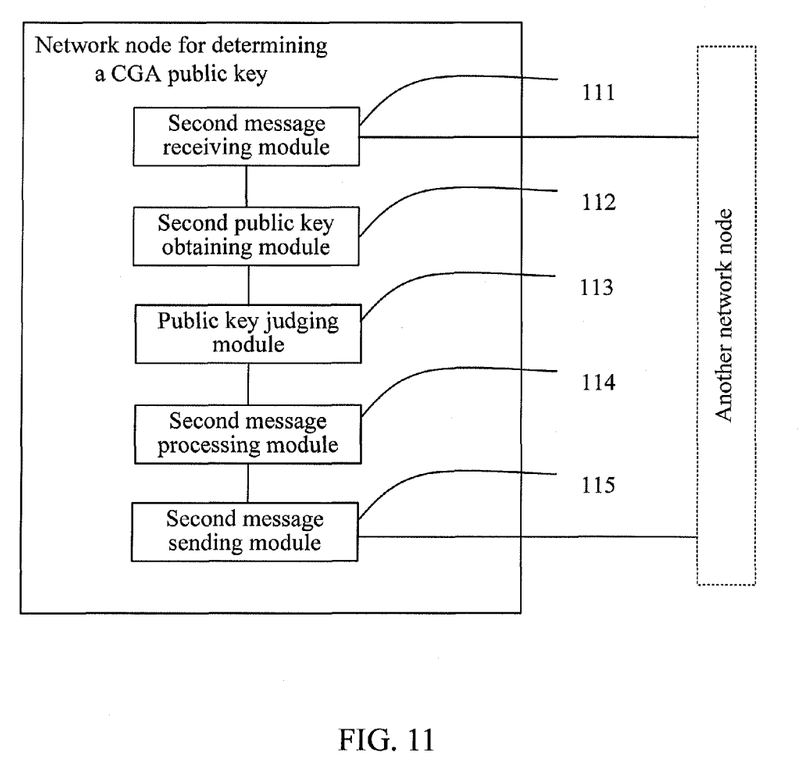
FIG. 11 shows a structure block diagram of a network node for assisting in determining a CGA public key according to Embodiment 8 of the present invention.

As shown in FIG. 11, a network node for determining a CGA public key is provided in this embodiment, and this network node may serve as the second network node described in the system according to the foregoing embodiment. The network node works with another network node to determine a CGA public key, and includes:

a second message receiving module 111, configured to receive a first message protected using a public key to be determined from the another network node;

a second public key obtaining module 112, configured to obtain a type of the public key to be determined according to the first message; and a public key judging module 113, configured to judge whether the public key to be determined is supported by the network node according to the type of the public key to be determined, and, if the public key to be determined is supported by the network node, determine the public key as the public key supported by the network node.

Optionally, the network node provided in this embodiment further includes:

a second message processing module 114, configured to use the public key to be determined to protect a second message if the public key judging module 113 determines that the public key to be determined is supported by the network node; and a second message sending module 115, configured to send the second message to the another network node.

The system for determining a CGA public key and the corresponding network nodes work in the similar way as the method described in the above embodiment.

The system and network nodes provided in the embodiments of the present invention can select CGA public key properly in the CGA that supports multiple public keys, and pave the way for developing the techniques of verifying and signing in CGA that support multiple public keys.

After reading the foregoing embodiments, those skilled in the art are clearly aware that the embodiments of the present invention may be implemented through hardware, or, preferably in most circumstances, through software plus a necessary universal hardware platform. Therefore, the technical solution under the present invention or the contributions to the prior art may be embodied as a software product. The software product may be stored in a storage medium (such as CD-ROM, USB flash disk, or mobile hard disk) and includes several instructions for instructing a computer device (such as personal computer, server, or network device) to execute the method specified in any embodiment of the present invention.

It is understandable to those skilled in the art that the accompanying drawings are only schematic diagrams of the preferred embodiments, and the modules or procedures in the accompanying drawings are not mandatory for implementing the present invention.

It is understandable to those skilled in the art that the modules in an apparatus provided in an embodiment of the present invention may be distributed in the apparatus in the way described herein, or may be located in one or more apparatuses different from the apparatuses described herein. The modules may be combined into one module, or split into multiple submodules.

The serial number of each embodiment above is for ease of description only rather than representative of preference order of the embodiment.

The above descriptions are merely preferred embodiments of the present invention, but are not intended to limit the scope of the present invention. Any modifications, variations or replacement that can be easily derived by those skilled in the art without departing from the spirit and scope of the invention should fall within the protection scope of the present invention. Therefore, the protection scope of the present invention is subject to the appended claims.

What is claimed is:

1. A method for determining a public key, comprising:
   selecting, by a sending node having at least a hardware processor, at least one candidate public key among N candidate public keys deployed locally beforehand as a potential public key, wherein N is a positive integer;
   using, by the sending node, the potential public key to protect a first message;
   sending, by the sending node, the first message protected to a receiving node;
   receiving, by the receiving node, the first message protected before the sending node uses the potential public key as the public key through negotiation with the receiving node;
   obtaining, by the receiving node, a type of the potential public key according to the first message;
   determining, by the receiving node, whether the potential public key is supported by the receiving node according to the type of potential the potential public key; and
   when the potential public key is supported by the receiving node, the receiving node uses the potential public key to protect a second message and send the second message to the sending node; the sending node obtains the type of the potential public key according to the second message and uses the potential public key as the public key through negotiation with the receiving node according to the type of the potential public key, wherein the potential public key comprises a Cryptographically Generated Address (CGA) key, and wherein the receiving node comprises at least a hardware processor and a non-transitory storage accessible to the hardware processor.

2. The method according to claim 1, wherein:

the selecting of at least one candidate public key among N candidate public keys deployed locally beforehand as the potential public key comprises:

selecting, by the sending node, all locally deployed N candidate public keys as potential public keys; and if at least one of the potential public keys is supported by the receiving node, using the potential public key to protect the second message comprises:

selecting, by the receiving node, at least one public key among the at least one public key supported by the receiving node to protect the second message.

3. The method according to claim 2, wherein:

the selecting of at least one candidate public key among the N candidate public keys supported by the receiving node to protect the second message comprises:

selecting, by the receiving node, a highest-priority public key among the at least one public key supported by the receiving node to protect the second message according to a selection priority order of public keys deployed locally.

4. The method according to claim 1, wherein:

the selecting of at least one candidate public key among the N candidate public key supported by the receiving node to protect the second message comprises:

selecting, by the sending node, all locally deployed N candidate public keys as potential public keys; and if at least two of the potential public keys are supported by the receiving node, the step of using of the potential public key to protect the second message comprises:

using, by the receiving node, at least two public keys supported by the receiving node to protect the second message in order.

5. The method according to claim 1, wherein:

a CGA parameter and a CGA signature generated according to the potential public key are carried in the first message; and the CGA parameter and the CGA signature generated according to the potential public key are carried in the second message;

the obtaining of the type of the potential public key according to the first message comprises:

obtaining, by the receiving node, the type of the potential public key according to the CGA parameter and the CGA signature carried in the first message;

the obtaining of the type of the potential public key according to the second message comprises:

obtaining, by the sending node, the type of the potential public key according to the CGA parameter and CGA signature carried in the second message.

6. The method according to claim 1, wherein:

if the sending node selects all locally deployed N candidate public keys as the potential public keys, N sets of CGA parameters and CGA signatures generated respectively according to the N potential public keys are carried in the first message;

the obtaining of the type of the potential public key according to the first message comprises:

obtaining, by the receiving node, a type of a first potential public key according to a first set of CGA parameter and CGA signature carried in the first message; if the first potential public key is not supported by the receiving node according to the type of the first public key, obtaining, by the receiving node, a type of a second potential public key according to a second set of CGA parameter and CGA signature carried in the first message; repeating such a process until a potential public key is supported by the receiving node according to a type of the potential public key.

7. The method according to claim 1, wherein:

if the potential public key is not supported by the receiving node, the method further comprises:

selecting, by the sending node, at least one candidate public key as a potential public key among candidate public keys that have not been selected as the potential public key in the N candidate public keys, and returning to step B.

8. The method according to claim 7, wherein:

the selecting of at least one candidate public key as a potential public key among candidate public keys that have not been selected as the potential public key in the N candidate public keys comprises:

selecting, by the sending node, a highest-priority candidate public key as the potential public key among the candidate public keys that have not been selected as the potential public key in the N candidate public keys according to the preset public key selection policy.

9. The method according to claim 1, further comprising:

returning, by the receiving node, a third message to the sending node if the potential public key is not supported by the receiving node, wherein the third message is used for indicating that the potential public key is not supported by the receiving node.

10. The method according to claim 1, further comprising:

if the potential public key is not supported by the receiving node, adding, by the receiving node, an indication of a public key supported by the receiving node into a third message, and sending the third message to the sending node;

obtaining, by the sending node, the type of the public key supported by the receiving node according to the indication carried in the third message after receiving the third message; and determining, by the sending node, whether the public key supported by the receiving node is a public key deployed on the sending node according to the type of public key supported by the receiving node;

determining, by the sending node, the public key successfully and notifying the type of the public key to supported by the receiving node the receiving node if the public key supported by the receiving node is a public key deployed on the sending node, or failing to determine the public key if the public key supported by the receiving node is not a public key deployed on the sending node.

11. A system for determining a public key, comprising:

a first network node comprising a first hardware processor coupled with a first non-transitory storage medium, configured to send a first message protected using a potential public key;

a second network node comprising a second hardware processor coupled with a second non-transitory storage medium, configured to receive the first message sent by the first network node before the first network node uses the potential public key as a public key through negotiation with the second network node, obtain a type of the potential public key according to the first message, determine whether the potential public key is supported by the second network node according to the type of the potential public key, and, if the potential public key is supported by the second network node, determine the public key as a public key supported by the second network node, wherein:

the potential public key comprises a Cryptographically Generated Address (CGA) key;

the first network node is further configured to select at least one candidate public key as the potential public key among N candidate public keys deployed locally, wherein N is a positive integer; and use the selected public key to protect the first message;

the second network node is further configured to use the potential public key to protect a second message if the potential public key is supported by the second network node, and send the second message to the first network node; and the first network node is further configured to obtain the type of the potential public key according to the second message, and use the potential public key according to the type of the potential public key as the public key through negotiation with the second network node.

12. A network node for determining a public key, wherein the network node works with another network node to determine a Cryptographically Generated Address (CGA) public key and comprises a hardware processor coupled with a non-transitory storage, the hardware processor is configured to:

select at least one candidate public key as a potential public key among N candidate public keys deployed on the network node, wherein N is a positive integer before the network node uses the potential public key as a public key through negotiation with the another network node;

use the public key to protect a first message;

send the first message to the another network node;

obtain a type of the potential public key according to a second message sent by the another network node; and use the potential public key as the public key through negotiation with the another network node according to the type of the public key, wherein the second message is protected using the potential public key.

13. A network node for determining a public key, wherein the network node works with another network node to determine a Cryptographically Generated Address (CGA) public key and comprises a hardware processor coupled with a non-transitory storage, the hardware processor is configured to:

receive a first message protected using at least one candidate public key among N candidate public keys deployed locally beforehand as a potential public key, wherein N is a positive integer, from the another network node before the another network node uses the potential public key as a public key through negotiation with the network node;

obtain a type of the potential public key according to the first message;

determine whether the potential public key is supported by the network node according to the type of the potential public key, and, if the potential public key is supported by the network node, determine the public key as a public key supported by the network node;

use the potential public key to protect a second message if it is determined that the potential public key is supported by the network node; and send the second message to the another network node, wherein the potential public key comprises a CGA key.

14. A method for determining a public key, comprising:

receiving, by a receiving node, a first message protected using a potential public key from a sending node wherein the receiving node comprises a first hardware processor coupled with a first non-transitory storage and the sending node comprises a second hardware processor coupled with a second non-transitory storage;

obtaining, by the receiving node, a type of the potential public key according to the first message; and determining, by the receiving node, whether the potential public key is supported by the receiving node according to the type of the potential public key, and, if the potential public key is supported by the receiving node, determining, by the receiving node, the potential public key as a public key supported by the receiving node;

wherein before the receiving of the first message protected using the potential public key from the sending node, the method further comprises:

A. selecting, by the sending node, at least one candidate public key among N candidate public keys deployed locally beforehand as the potential public key, wherein N is a positive integer;

B. using, by the sending node, the potential public key to protect the first message; and C. sending, by the sending node, the first message protected to the receiving node;

wherein if the potential public key is supported by the receiving node, the method further comprises:

using, by the receiving node, the potential public key to protect a second message;

sending, by the receiving node, the second message to the sending node; and obtaining, by the sending node, the type of the potential public key according to the second message, and using, by the sending node, the potential public key as a public key through negotiation with the receiving node according to the type of the potential public key;

wherein the selecting of at least one candidate public key among N candidate public keys deployed locally beforehand as the potential public key comprises:

selecting, by the sending node, all locally deployed N candidate public keys as potential public keys; and if at least one of the potential public keys is supported by the receiving node, using the potential public key to protect the second message comprises:

selecting, by the receiving node, at least one public key among the at least one public key supported by the receiving node to protect the second message.

15. The method according to claim 14, wherein:

selecting of at least one public key among the at least one public key supported by the receiving node to protect the second message comprises:

selecting, by the receiving node, a highest-priority public key among the at least one public key supported by the receiving node to protect the second message according to a selection priority order of public keys deployed locally.

16. The method according to claim 14, wherein:

selecting of at least one public key among the at least one public key supported by the receiving node to protect the second message comprises:

selecting, by the sending node, all locally deployed N candidate public keys as potential public keys; and if at least two of the potential public keys are supported by the receiving node, the step of using of the potential public key to protect the second message comprises:

using, by the receiving node, at least two public keys supported by the receiving node to protect the second message in order.

17. The method according to claim 14, wherein:

if the sending node selects all locally deployed N candidate public keys as the potential public keys, N sets of Cryptographically Generated Address (CGA) parameters and CGA signatures generated respectively according to the N potential public keys are carried in the first message;

obtaining of the type of the potential public key according to the first message comprises:

obtaining, by the receiving node, a type of a first potential public key according to a first set of CGA parameter and CGA signature carried in the first message; if the first potential public key is not supported by the receiving node according to the type of the first public key, obtaining, by the receiving node, a type of a second potential public key according to a second set of CGA parameter and CGA signature carried in the first message; repeating such a process until a potential public key is supported by the receiving node according to a type of the potential public key.

18. The method according to claim 14, wherein:

if the potential public key is not supported by the receiving node, the method further comprises:

selecting, by the sending node, at least one candidate public key as a potential public key among candidate public keys that have not been selected as the potential public key in the N candidate public keys, and returning to step B;

wherein the selecting of at least one candidate public key as a potential public key among candidate public keys that have not been selected as the potential public key in the N candidate public keys comprises:

selecting, by the sending node, a highest-priority candidate public key as the potential public key among the candidate public keys that have not been selected as the potential public key in the N candidate public keys according to the preset public key selection policy.

19. The method according to claim 14, further comprising:

if the potential public key is not supported by the receiving node, adding, by the receiving node, an indication of a public key supported by the receiving node into a third message, and sending the third message to the sending node;

obtaining, by the sending node, the type of the public key supported by the receiving node according to the indication carried in the third message after receiving the third message; and determining, by the sending node, whether the public key supported by the receiving node is a public key deployed on the sending node according to the type of public key supported by the receiving node;

determining, by the sending node, the public key successfully and notifying the type of the public key to supported by the receiving node the receiving node if the public key supported by the receiving node is a public key deployed on the sending node, or failing to determine the public key if the public key supported by the receiving node is not a public key deployed on the sending node.

* * * * *